United States Patent
Manssour et al.

(10) Patent No.: US 9,294,221 B2
(45) Date of Patent: Mar. 22, 2016

(54) METHOD AND ARRANGEMENT FOR RETRANSMISSION CONTROL

(75) Inventors: Jawad Manssour, Stockholm (SE); Afif Osseiran, Kista (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 279 days.

(21) Appl. No.: 13/883,791

(22) PCT Filed: Nov. 8, 2010

(86) PCT No.: PCT/SE2010/051221
§ 371 (c)(1),
(2), (4) Date: May 7, 2013

(87) PCT Pub. No.: WO2012/064237
PCT Pub. Date: May 18, 2012

(65) Prior Publication Data
US 2013/0246876 A1 Sep. 19, 2013

(51) Int. Cl.
*H04L 1/18* (2006.01)
*H04L 1/00* (2006.01)

(52) U.S. Cl.
CPC .............. *H04L 1/004* (2013.01); *H04L 1/0041* (2013.01); *H04L 1/0045* (2013.01); *H04L 1/1819* (2013.01); *H04L 1/1829* (2013.01); *H04L 1/1867* (2013.01)

(58) Field of Classification Search
None
See application file for complete search history.

(56) References Cited

U.S. PATENT DOCUMENTS

2002/0184590 A1* 12/2002 Ramaswamy ........ H03M 13/05
714/752
2007/0253423 A1* 11/2007 Chindapol ............ H04L 1/0041
370/394

(Continued)

FOREIGN PATENT DOCUMENTS

| EP | 2131518 A2 | 12/2009 |
|---|---|---|
| EP | 2178239 A2 | 4/2010 |
| WO | 2008108700 A2 | 9/2008 |

OTHER PUBLICATIONS

Jolfaei, M. A. "Stutter XOR Strategies: A New Class of Multicopy ARQ Strategies." Proceedings of the 1994 International Conference on Network Protocols, Oct. 25-28, 1994, pp. 56-62.

(Continued)

*Primary Examiner* — April Y Blair
*Assistant Examiner* — Thien D Nguyen
(74) *Attorney, Agent, or Firm* — Patent Portfolio Builders, PLLC

(57) ABSTRACT

A method and arrangement for retransmission control. A method in a sending system entity for controlling retransmissions of data to a sending system entity is provided. Initial data encoded with a first forward error correction code is sent 200 to the receiving system entity. When transmitted initial data is determined to be affected by errors at the receiving system entity, the sending system entity receives 202 a request to retransmit the initial data combined 204 by new data encoded with a second forward error correction code in a combined data stream which is encoded 206 with a third forward error correction code before being sent 208 to the receiving system entity. By combining initial data and encoded new data in a combined data stream when resending, an effective and flexible procedure for retransmissions is achieved, which doesn't introduce any substantial delay of the data.

12 Claims, 7 Drawing Sheets

(56) References Cited

U.S. PATENT DOCUMENTS

| | | | |
|---|---|---|---|
| 2008/0082890 A1* | 4/2008 | Choi | H04L 1/1867 714/748 |
| 2008/0282125 A1 | 11/2008 | Hafeez et al. | |
| 2009/0132885 A1* | 5/2009 | Park | H04L 5/006 714/748 |
| 2009/0307559 A1* | 12/2009 | Wu | H04L 1/1867 714/749 |
| 2010/0146355 A1 | 6/2010 | Jiang et al. | |
| 2011/0078529 A1* | 3/2011 | Wu | H04L 1/1887 714/748 |

OTHER PUBLICATIONS

Xiao, L. "Nested Codes with Multiple Interpretations." 2006 40th Annual Conference on Information Sciences and Systems, Mar. 22-24, 2006, pp. 851-856.

* cited by examiner

METHOD AND ARRANGEMENT FOR RETRANSMISSION CONTROL

TECHNICAL FIELD

The present invention relates generally to control of retransmissions in communication networks. In particular, the present invention can be used in mobile communication networks.

BACKGROUND

Transmissions over wireless channels are subject to errors mainly due to the unreliable nature of the wireless medium. One way to overcome this unreliability is through the usage of link adaptation that provides a way of overcoming the fluctuations in the received signal. However, receiver noise and unpredictable variations in interference make it all the tougher that link adaptation will suffice to have a robust transmission. One other way to increase the robustness of the transmission is through the usage of Hybrid Automatic Repeat reQuest (HARQ) which is a combination of error correcting codes (mainly based on forward error correction (FEC)) and error detecting codes (such as Automatic Repeat reQuest (ARQ)). FEC schemes aim at making the transmission more reliable by adding redundant bits to the actual information bits to be transmitted. This added redundancy will result in a more robust transmission, but would inherently lead to a lower transmission rate (due to the addition of redundant bits). ARQ schemes consist of using an error-detecting code at the receiver, typically based on the usage of a cyclic redundancy check (CRC) to detect if there are errors in the received packet. In case errors were found, a negative acknowledgment (NACK) is sent to the transmitter so it would retransmit the erroneous packet. A more practical and powerful operation of HARQ is when it is used in conjunction with soft combining. This means that packets that were received erroneously are not discarded, but are rather combined with the consequently retransmitted data to obtain a more reliable combined packet. Based on the nature of the retransmitted bits, two variants of HARQ with soft combining exist: Chase combining (CC) and incremental redundancy (IR).

The main goal of HARQ schemes is to achieve a more reliable communication through the usage of a combination of error-correcting and error-detecting codes. The error correcting code tries to correct eventual errors in the received packet. In case not all errors can be corrected, the error detecting code is supposed to detect this and require the transmitter to retransmit the erroneous data. However, the retransmissions in any HARQ scheme, by definition, consist of the same set of information bits as the original transmission. This mainly means that extra bandwidth, time and power are used in order to convey information that was already transmitted (but incorrectly decoded). Consequently, the robustness achieved using HARQ schemes in any of its variants would come on the expense of: A reduction in the effective transmission rate, hence a decrease in spectral efficiency. The effective rate of the transmission is defined as the total number of information bits divided by the total number of coded bits (i.e. information bits and redundant bits) that were transmitted until a correct reception was possible. For instance, if k bits were coded into n bits (i.e. using a code with rate k/n), and a total of 2 transmissions were needed before the data was correctly decoded at the receiver (i.e. the initial transmission and one retransmission), the effective rate of that transmission is k/2n, resulting in a 50% decrease in the achievable spectral efficiency as compared to the case where the initial transmission was correctly decoded. Even though the HARQ process is supposed to be fast, the fact of data retransmission per se will lead to an increased delay. This delay is due to the time that the transmitter would need to reprocess the data to be retransmitted in addition to the actual retransmission time. This would lead to a delay in the transmission of the packets that were eventually scheduled after the retransmission.

Some methods for controlling retransmissions are known through the patent publications US 20080282125 and WO 2008108700, which both describes methods sending data to plural receivers. With reference to FIG. 1 showing a signalling chart, a retransmission process according to prior art will be disclosed. In a first step 1:1, initial data is sent from a sending system entity 100 to a receiving system entity 102. The receiving system entity 100 determines whether the initial data is affected by errors in a following step 1:2. Typically, the initial data is encoded with a code based on so called Cyclic Redundancy Check, enabling the receiving system entity to determine that the transmission is affected by errors. If the initial data was affected by errors, the receiving system entity requests the sending system entity 100 to retransmit the initial data, in a subsequent step 1:3 (indicated with a negative acknowledgement, so called NACK). If, on the other hand, the initial data received in step 1:1 was not affected with errors the process continues directly by executing the step 1:7.

In the following step 1:4, the sending system entity 100 determines to retransmit the initial data, and sends the initial data in another step 1.5. In the following step 1:6, the receiving system entity determines whether the resent data is affected by errors. The step 1:6 is similar to the step 1:2. If the receiving system entity 102 determines that the received data was unaffected by errors, it acknowledges the successful reception by in a following step 1:7, which also is the case when the initial data received in step 1:1 is unaffected by errors. In step 1:8, the sending system entity 100 then decides to proceed the transmission, and sends new data in the final step 1:9. The transmission proceeds then by sending data, to be acknowledged or requested to be retransmitted.

It therefore, exists a need for a flexible, fast, non-complex method for control of retransmissions in communication channels.

SUMMARY OF INVENTION

It would be desirable to obtain an effective and less delaying process for retransmissions of data. It is an object of the invention to address at least some of the issues outlined above.

According to one aspect is a in a sending system entity for controlling retransmissions of data to a receiving system entity provided. Initial data is sent encoded with a first forward error correction code to the receiving system entity, and a request from the receiving system entity indicating that the initial data shall be retransmitted is received. The initial data is combined with new data which is encoded with a second forward error correction code. Finally, is the combined data encoded with a third forward error correction code, resulting in a coded data stream which is transmitted to the receiving system entity. The second forward error correction code may be selected to be more robust than the first forward error correction method. The data to be resent may further be encoded with the first Forward error correction code before being combined, if the second Forward error correction code and the first Forward error correction code belongs the same coding family and have the same length, and/or the second Forward error correction code has a higher capability to correct errors than the first Forward error correction code.

According to another aspect is a method in a receiving system entity for controlling retransmission of data from a sending system entity provided. It is determined whether the initial data is affected by errors when received. If the initial data is affected by errors it is stored at the receiving system entity and the sending system entity is requested to retransmit the initial data correct. The requested initial data which is unaffected by errors is received bitwise combined with the new data. It is determined that the combined data is unaffected by errors and the initially sent data and the new data is determined based on the stored data and the combined data. The determination that the initial data is affected by errors and corrections of the errors may be performed by applying a first forward error correction code on the received data.

The determination of new data and retransmitted data may be performed by determining an estimate of the new data which is affected by errors, by bitwise combining the received combined data and the stored initial data which is affected by errors. The new data which is unaffected by errors is determined, by decoding the estimate with a second Forward Error Correcting Code, and the determined new data is encoded by applying the second Forward Error Correction code. Finally, is the new data and the received combined data bitwise combined, resulting in the resent data. The bitwise combining may be performed by applying an XOR operation.

According to another aspect is a sending system entity provided which is adapted to control retransmissions of data to a receiving system entity. The sending system entity comprises a communication unit which is adapted to send initial data to the receiving system entity and is further adapted to send combined data to the receiving system entity. The sending system entity comprises also a combination unit which is adapted to bitwise combine data to be retransmitted with new data into a combined data stream before being retransmitted. A forward error correction unit is adapted to encode the initial data to be sent by applying a first forward error correction code, and encode the new data by applying a second forward error correction code before being combined, and is further adapted to encode the combined data stream by applying a third forward error correction code before being transmitted. Furthermore comprises the sending system entity a control unit which is adapted to receive requests for retransmission of data from the receiving system entity, and is further adapted to control when initial data will be sent and when combined data will be sent.

According to yet another aspect is a receiving system entity provided which is adapted to control retransmissions of data from a sending system entity. The receiving system entity comprises a communication unit which is adapted to receive initial data from the sending system entity and further adapted to receive combined data from the sending system entity, the combined data comprising resent data and new data. A forward error correction unit which is adapted to determine whether the initial data is affected by errors or not, to store the initial data which is affected by errors, and further adapted to determine whether the combined data is affected by errors or not, is further comprised in the receiving system entity. Furthermore, comprises the receiving system entity a combination unit which is adapted to determine the resent data and the new data based on the stored initial data which is affected by errors and the combined data which is not affected by errors. Moreover, comprises the receiving system entity a control unit which is adapted to monitor when the receiving system entity receives initial data and when the receiving system entity receives combined data, and is further adapted to request the sending system entity to retransmit data which is affected by errors.

These objects may be met by a method and apparatus according to the attached independent claims.

BRIEF DESCRIPTION OF DRAWINGS

The invention is now described, by way of example, with reference to the accompanying drawings, in which.

DESCRIPTION OF EMBODIMENTS

Briefly described, a solution is provided for enabling a more flexible, effective, robust, and less delayed process for retransmissions of data. A sending system entity combines bitwise initial data to be retransmitted with new data into a combined data stream which is transmitted, without affecting the transmission rate substantially, i.e. the retransmitted data will be transmitted "piggy-backed" on the new data. A receiving system entity determines the retransmitted data and the new data, based on the received combined data and earlier received initial data which is affected by errors and initiated the retransmission. The same non-linear operation will be employed both for combining the data streams to be sent into a combined data stream, and to determine retransmitted data and new data from the received combined data stream.

In this description, the term "sending system entity" is used to generally represent any system entity capable of wireless communication with a receiving system entity terminal. A sending system entity of a cell in a wireless network may transmit data and control information in a physical downlink channel to a receiving system entity, and a receiving system entity may likewise transmit data and control information in a physical uplink channel in the opposite direction to the sending system entity. In this description, a physical downlink or uplink channel is generally referred to as a wireless link between a sending entity and a receiving entity. Further, the terms "sending entity" and "receiving entity" are used here merely to imply the direction of the wireless link considered, although these entities can of course both receive and send data and messages in an ongoing communication. Typically, a sending system entity will be implemented as a base station, a NodeB or an eNodeB, and a receiving system entity will be implemented as a mobile terminal or a User Equipment.

With "estimate" is in this description meant a variant of a data stream, i.e. the data stream is affected by errors on the same bits as another data stream is affected by errors. The errors are transferred from one data stream to another datastream.

Furthermore, it must be noted that, as used in the specification and the appended claims, the plural forms, e.g. errors, retransmissions, and request also include singular referents unless the context clearly dictates otherwise. Thus, for example, reference to "errors", includes also only one error, and the like.

In the embodiments which will be described below, the term "forward error correction codes" will denote as well codes which enable detection of errors as well as correction of errors.

By applying a suitable function to bitwise combine data to be retransmitted and new data in a sending system entity, the combined data stream could be split up by applying the same function at a receiving system entity.

Figure 1:
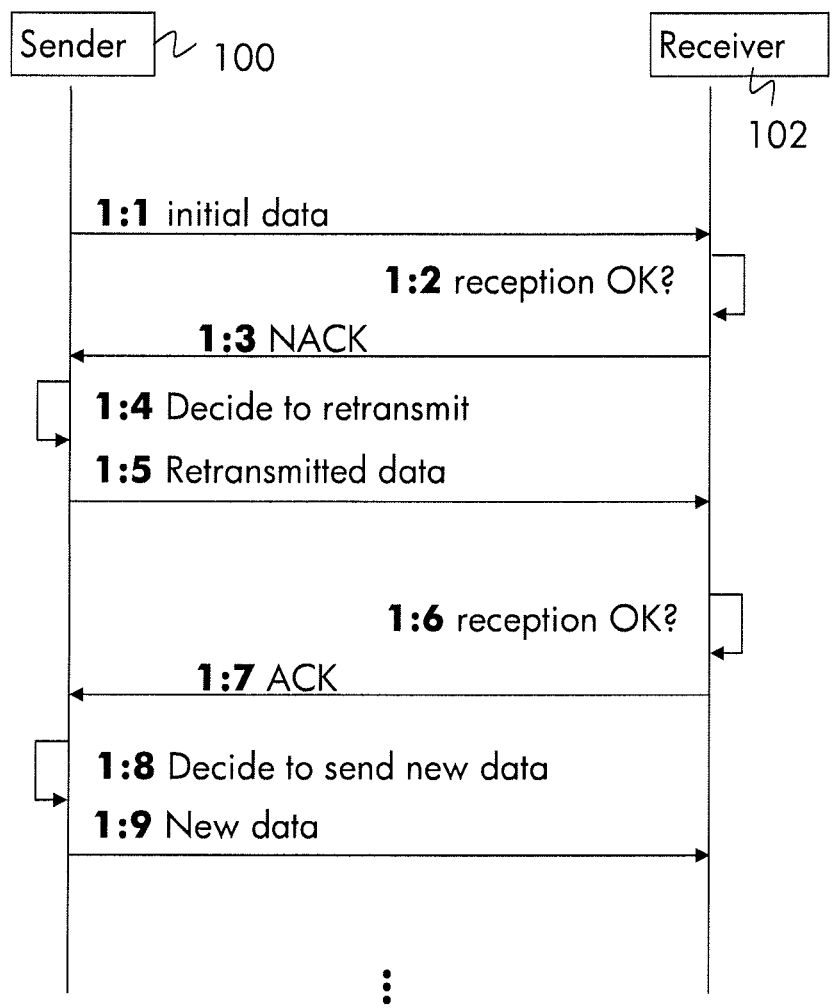
FIG. 1 is a signalling chart illustrating a retransmission procedure according to prior art.
Figure 2:
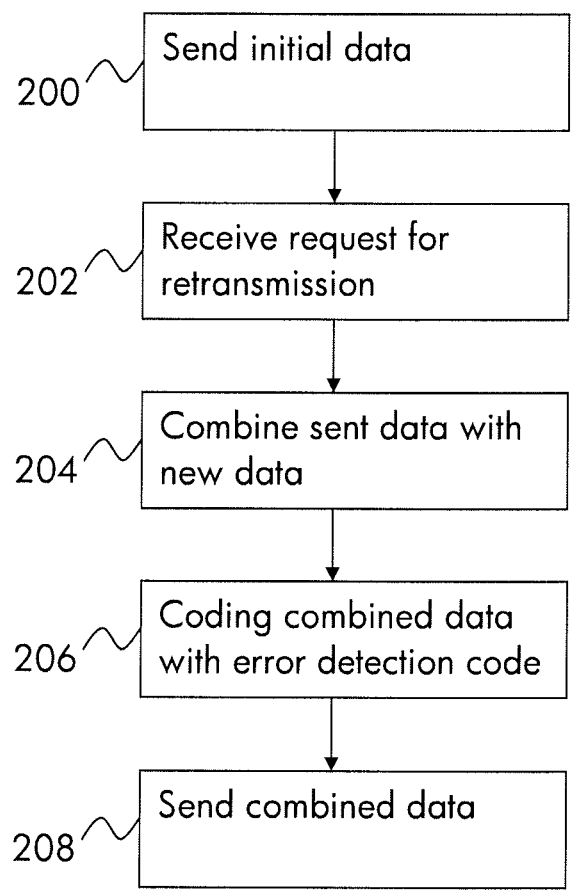
FIG. 2 is a flow chart illustrating a method in a sending system entity for retransmission control according to an embodiment.

With reference to FIG. 2, showing a schematic flow chart, a method for controlling retransmissions of data in a sending system entity, sending data to a receiving system entity will now be described in accordance with an embodiment.

In a first step 200, the sending system entity sends data to a receiving system entity. The data is encoded with a first forward error correction code to enable the receiving system entity to determine whether the received data has been affected by errors during the transmission, and to correct errors in the received data if possible. The sent data is stored at the sending system entity, to enable the sending system entity to resend it upon request from the receiving system entity.

In a following step 202, the sending system entity receives a request for retransmission of some data sent in step 200. The sending system entity combines then the stored data to be resent with new data to be sent into a combined data stream in a subsequent step 204. The new data stream is further encoded with a second forward error correction code to enable the receiving system entity to determine if the received new data is affected by errors, and to correct the errors if possible when received. Typically, the second forward correction code is selected as a more robust forward error correction code than the first forward error correction code, such that the second error correction code would have been able to correct enough errors in the initial transmission to ensure correct data reception.

In a following step 206, the combined data stream is encoded with a third forward error correction code before being sent to the receiving system entity in a final step 208. Encoding the combined data stream enables the receiving system entity to determine that the received combined data stream is unaffected by errors when received, and to correct detected errors if possible.

In this embodiment, the combination in step 204 is performed by bitwise applying an XOR-operation on the new data and data to be retransmitted, which enables the receiving system entity to split up the combined data stream into new data and resent data by applying a bitwise XOR-operation on the combined data stream. However, any other suitable functions for combining the data streams enabling decoding with the same function at the receiving system entity may be applied in the manner described.

Figure 3:
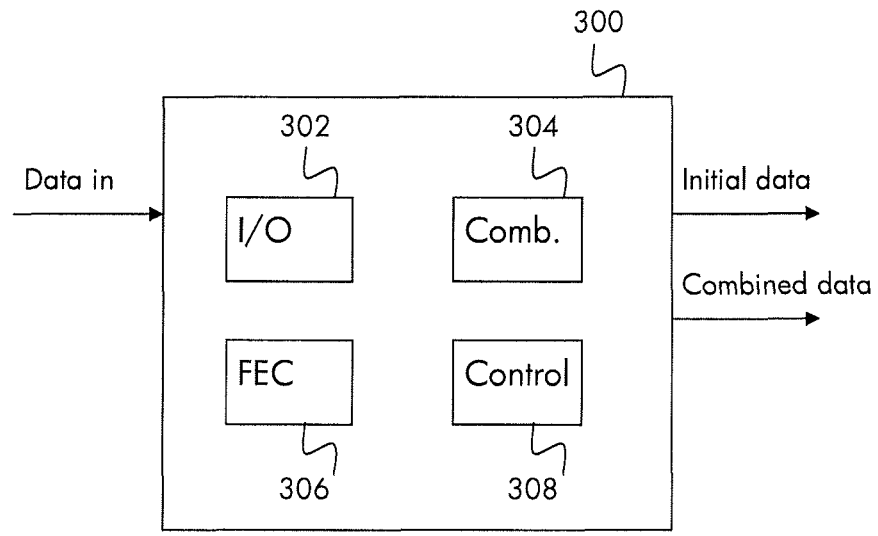
FIG. 3 is a block diagram illustrating a sending system entity according to another embodiment.

With reference to FIG. 3, showing a schematic block diagram, a sending system entity 300 will now be described in accordance with an embodiment.

The sending system entity 300 is adapted to send data to a receiving system entity, and resend the data combined with new data to the receiving system entity upon request from the receiving system entity. The sending system entity 300 comprises a communication unit 302, a forward error correction unit 306, a combination unit 304 and a control unit 308. The communication unit 302 is adapted to send new data and combined data to the receiving system entity. The new data to be sent is typically incoming data from a user, and is realised as a data stream. The combination unit 304 is adapted to combine data to be retransmitted with new data before being sent to the receiving system entity. The forward error correction unit 306 is adapted to encode the data to be sent with a forward correction error code, to enable the receiving system entity to determine whether the received data is affected by errors or not. The forward error correction unit 306 according to this embodiment encodes new data with a first forward error correction code, and combined data with a second forward error correction code. The control unit 308 is adapted to control the sending process. For instance the control unit 308 controls when the sending system entity 300 will send new data and when it will resend data combined with new data. The control unit 308 informs the forward error correction unit 306 which forward error correction code to apply for encoding the data to be sent.

It is to be denoted that even if the incoming data is illustrated as a data stream in the figure, may the sending system entity easily be modified and applied on other information to be sent, within the inventive concept. For instance, it may be designed to record a user's voice and convert into a data stream to be sent.

Furthermore, it is to be understood that the sending system entity 300 described above also comprises additional conventional means providing functionality, such as e.g. various control units and memories, necessary for enabling common functions and features to operate properly. For instance, comprises the sending system entity 300 means for receiving information regarding which data to resend and when to resend, and modulation means. However, for simplicity reasons, any means or functionality which is not necessary for the understanding of the proposed enabling of the resending services has been omitted in the figures, and will not be discussed in any further detail in this description.

Figure 4:
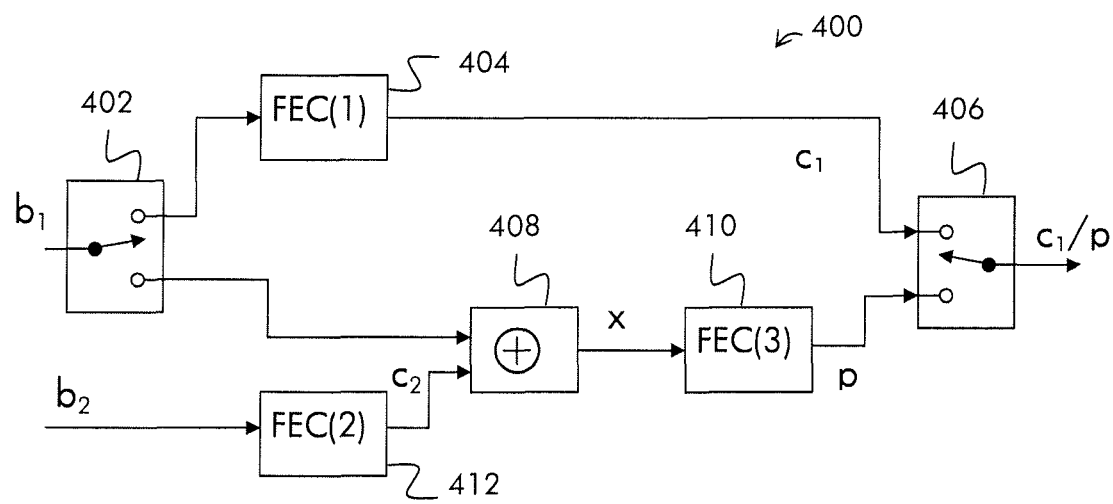
FIG. 4 is a block diagram illustrating a sending system entity according to a further embodiment.

With reference to FIG. 4, showing a schematic block diagram, a sending system entity 400 will now be described in accordance with an embodiment.

The sending system entity 400 is adapted to send data to a receiving system entity, and resend the data combined with new data to the receiving system entity upon request from the receiving system entity. The sending system entity 400 comprises a first communication unit 402, a first forward error correction unit 404, a second communication unit 406, a combination unit 408, a second forward error correction unit 410, and a third forward error correction unit 412. Typically, the functions of the forward error correction units 404, 410, 412 are implemented in one and the same unit, but for illustrative purposes they are illustrated as separate units in this embodiment. Correspondingly, the function of the communication units 402, 406 may be implemented in one and the same unit.

The first communication unit 402 is adapted to receive a data stream $b_1$ to be transmitted to a receiving system entity (not shown). An output of the first communication unit 402 is further connected to the an input of the first forward error correction unit 404, which is adapted to encode the data stream $b_1$ with a first error detection code, resulting in a first encoded data stream $c_1$. A first input of the second communication unit 406 is connected to output of the first forward error correction unit 404 and the second communication unit 406 is adapted to receive the encoded data stream $c_1$ on the first input and send it to the receiving system entity. By encoding the data stream $b_1$ with the first forward error correction code, the receiving system entity will be able to determine whether the received data stream $c_1$ is affected by errors when received, correct detected errors if possible, and request retransmission of data if the errors can not be corrected. When there is no request for retransmission of data, the sending system entity 400 employs the above described branch for transmitting new data. Typically, the sent data $b_1$ is stored in a buffer (not shown) to enable the sending system entity 400 to resend it upon request.

However, due to various reasons, e.g. that received data is affected by errors or missing, data has to be retransmitted. For that purpose, the sending system entity 400 is further provided with a resend branch (not referred to), wherein a second output of the first communication unit 402 is connected to a first input of the combination unit 408. The second forward error correction unit 412 is further adapted to receive new data $b_2$ on the first input, and encode it with a second forward error correction code into a second encoded data stream $c_2$. Typically, the second forward error correction unit 410 employs a more robust forward error correction code than the first forward error correction unit 404. The combination unit 408 is adapted to receive the data to be resent $b_1$ on one input and the second encoded data stream $c_2$ on another input and combine the data streams $b_1$, $c_2$ into a combined data stream x. The third forward error correction unit 410 is adapted to encode the combined data stream x with a third forward error correction code, resulting in a third encoded data stream p, to enable the receiving system entity to determine that the third encoded data stream p is not affected by errors when received, and correct the errors if possible. The second communication unit 406 is further adapted to send the combined encoded data stream p to the receiving system entity. The sending system entity 400 is further adapted to control the communication units 402, 406 by switching to the second branch upon request for retransmission, and switch back to the first branch when there is no data left to retransmit. It is also to be denoted that when no requests for retransmissions are received, the sending system entity does not use the second branch.

However, even the combined encoded data stream p may be affected by errors when received by the receiving system entity. In an alternative embodiment, based on the one above, the sending system entity 400 may be provided by one or more additional branches for resending data, the additional branches corresponding to the above describe second branch. Alternatively, one or more additional buffering steps may be provided at the first communication unit 402, and the described resend branch may be used with the buffered data of the added buffering steps combined with new data when transmitted.

Moreover, the skilled person may design the branches alternatively within the inventive concept to further increase the robustness of the system, e.g. by encoding the data to be resent $b_1$ with the first forward error correction code before being combined in the combination unit 408. For some channel codes, the third forward error correction unit 410 might then be redundant and removed.

Figure 5:
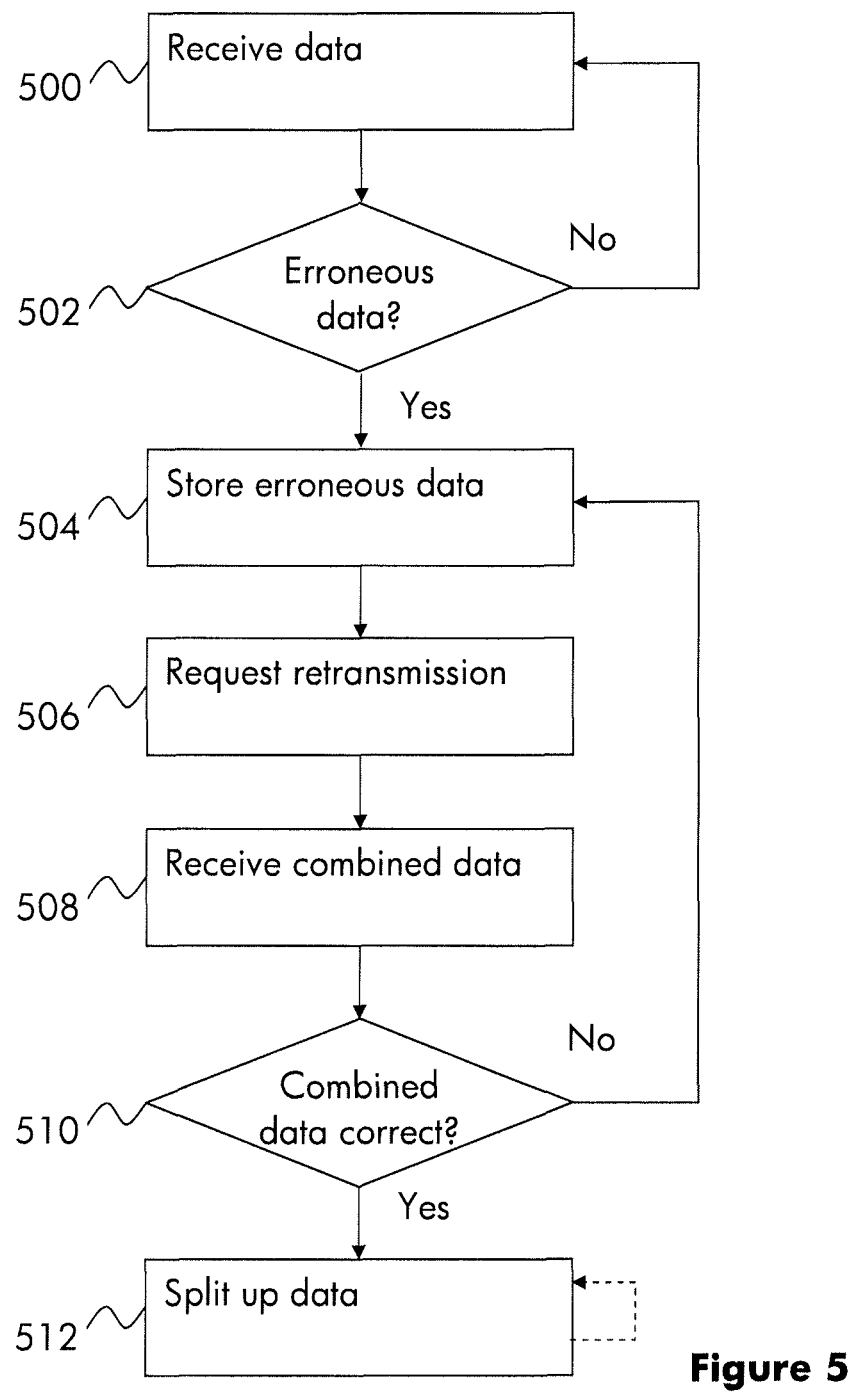
FIG. 5 is a flow chart illustrating a method in a receiving system entity for retransmission control according to an embodiment.

With reference to FIG. 5, showing a schematic flow chart, a method for controlling retransmissions of data in a receiving system entity, receiving data from a sending system entity will now be described in accordance with an embodiment. In the embodiment, the term "initial data" will be used to denote the data being received when no retransmissions are requested.

In a first step 500, the receiving system entity receives initial data encoded with a first forward error correction code from a sending system entity. The receiving system entity determines whether the received initial data has been affected by errors during the transmission or not and corrects the errors if possible, by applying the first forward error correction code on the received initial data, in a following step 502. If it is determined that the received initial data is affected by errors which can not be corrected, the receiving system entity stores the initial data which is affected with errors, in a following step 504, and requests the sending system entity to retransmit the initial data that was affected by errors in a subsequent step 506. As described above, the request is typically sent on a control channel. If on the other hand, it is determined that the initial data is not affected by errors or the errors could be corrected, the receiving system entity repeats step 500 and proceeds receiving initial data, until it determines that incoming initial data is affected by errors which is not possible to correct.

In a following step 508, the sending system entity receives a combined data stream comprising the requested data combined with new data. The received combined data is encoded with a third forward error correction code, and the new data which is comprised was further encoded with a second forward error correction code before being combined. The receiving system entity determines whether the received combined data stream is affected by errors, by decoding it with the third forward error correction code, in a following step 510. If it is determined that the combined data stream was received unaffected by errors, the sending system entity proceeds with splitting up the combined data in new data and retransmitted data, in the following step 512. If, on the other hand, it is determined that the combined data stream was affected by errors, the sending system entity proceeds with repeating step 504, where it store the erroneous data and requests retransmission of the combined data, further combined with new data in step 506.

In a final step 512, the combined data which is determined to be unaffected by errors is split up into new data and resent data. The process of splitting up the combined data is in this embodiment performed by executing the following sub-steps:

a. determine an estimate of the new data, where the corresponding bits as in the erroneous data stored in step 504 are erroneous, by combining the unaffected combined data of step 510 with the erroneous initial data stored in step 504, b. determine the new data being unaffected by errors, by decoding the estimate of sub-step a with the second forward error correction code, c. determine the encoded new data that was encoded with the second forward error correction code at the sending system entity, by encoding the determined new data of sub-step b with the second forward error correction code that was employed in the sending system entity, d. determine the data that was resent by the sending system entity, by combining the determined new data and the received combined data being determined unaffected by errors.

In this embodiment the sending system entity bitwise combines the data streams employing the XOR-operation described in an embodiment above. However, the invention is not limited to employ XOR, other suitable operations for combining the data streams, may also be employed.

If the step 504 was repeated, the combined data may be a combined data stream comprising new data and data already being combined. The step 512 will then be repeated (indicated with a dotted arrow) by splitting up each level of combined data, i.e. first splitting up the last combined data into new data and already combined data, then splitting up the already combined data into new data and resent data, etc.

In an alternative embodiment, based on the above described, the erroneous data streams are not corrected in step 502, retransmission is instead requested upon detection of errors.

Figure 6:
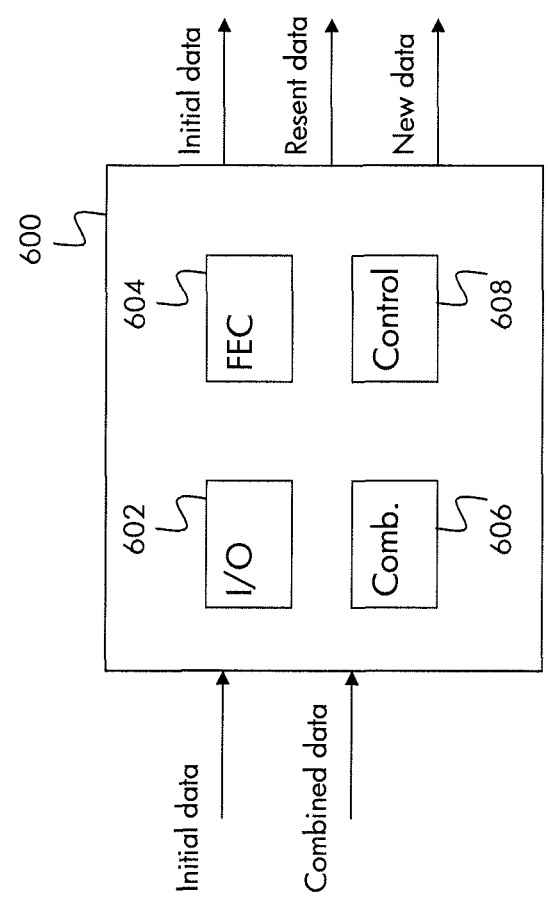
FIG. 6 is a block diagram illustrating a receiving system entity according to another embodiment.

With reference to FIG. 6, showing a schematic block diagram, a receiving system entity 600 will now be described in accordance with an embodiment.

The receiving system entity 600 is adapted to receive initial data from a sending system entity, request retransmission of data, and receive resent data combined with new data from the sending system entity. The receiving system entity 600 comprises a communication unit 602, a forward error correction unit 604, a combination unit 606 and a control unit 608. The communication unit 602 is adapted receive initial data and combined data from the sending system entity. The forward error correction unit 604 is adapted to decode the received initial data employing a first forward error correction code and determine if the initial data is affected by errors. Furthermore, the forward error correction unit 604 is adapted to store initial data being affected by errors. The forward error correction unit 604 is further adapted to decode the received combined data employing a third forward error correction code and determine if the combined data is affected by errors. The combination unit 606 is adapted to determine the new data and the resent data, based on the received combined data being unaffected by errors and the stored initial data which is affected by errors. The control unit 608 is adapted to control the receiving process. For instance the control unit 608 controls when the sending system entity 600 receives initial data and combined data, respectively, and requests the sending system entity to perform retransmissions. The control unit 608 informs the forward error correction unit 604 which forward error correction code to apply for decoding data received from the sending system entity.

As described in an embodiment above, the functionality of correcting errors may be implemented in the forward error correction unit.

Furthermore, the receiving system entity 600 is adapted to process initial data, the determined resent data and new data into a combined data stream. Typically, the receiving system entity comprises one or more buffering steps adapted to store one or more of: initial data, resent data, and new data, to enable the receiving system entity 600 to reconstruct the received data.

Furthermore, it is to be understood that the receiving system entity 600 described above also comprises additional conventional means providing functionality, such as e.g. various control units and memories, necessary for enabling common functions and features to operate properly. For instance, comprises the receiving system entity 600 means for sending information regarding which data to resend and when to resend, and modulation means. However, for simplicity reasons, any means or functionality which is not necessary for the understanding of the proposed enabling of the resending services has been omitted in the figures, and will not be discussed in any further detail in this description.

Figure 7:
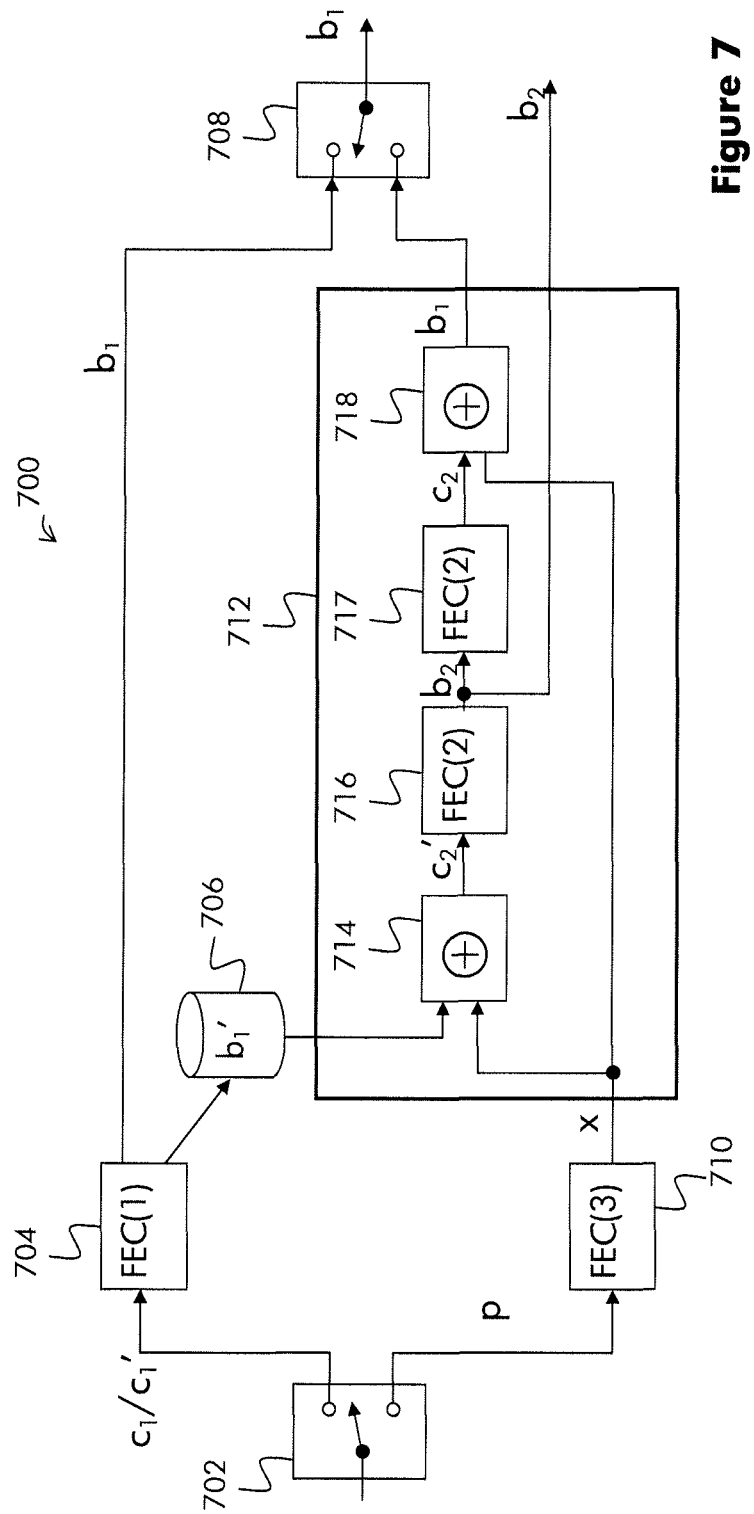
FIG. 7 is a block diagram illustrating a receiving system entity according to a further embodiment.

With reference to FIG. 7, showing a schematic block diagram, a receiving system entity 700 will now be described in accordance with an embodiment.

The receiving system entity 700 is adapted to receive encoded initial data $c_1$, $c_1'$ from a sending system entity, and further adapted to request the sending system to retransmit the initial data b1 if the encoded initial data $c_1'$ was affected by errors. The receiving system entity 700 is further adapted to receive the retransmitted data $b_1$ combined with encoded new data $c_2$ from the sending system entity 700 in an encoded combined data stream p. The receiving system entity 700 comprises a first communication unit 702, a first forward error correction unit 704, a memory 706, a second communication unit 708, a third forward error correction unit 710, and a determination unit 712. The determination unit 712 in turn comprises a first combination unit 714, a second forward error correction unit 716, and a second combination unit 718. Typically, the functions of the forward error correction units 704, 710, 716 are implemented in one and the same unit, but for illustrative purposes they are illustrated as separate units in this embodiment. Similarly, may the function of the communication units 702, 708 be implemented in one unit adapted therefore, and the function of the combination units 714, 718 be implemented in another unit adapted therefore. For illustrative purposes and in order to make the understanding of the embodiment easier, the units are separated in the figure.

The first communication unit 702 is adapted to receive a data stream $c_1$, $c_1'$, p transmitted from a sending system entity (not shown). Typically, the data stream comprises one of: encoded initial data $c_1$ which is unaffected by errors; encoded initial data $c_1'$ which is affected by errors; encoded combined data p comprising resent initial data $b_1$ and encoded new data $c_2$. An output of the first communication unit 702 is connected to an input of the first forward error correction unit 704, which is adapted to determine whether the encoded initial data stream $c_1/c_1'$ is affected by errors or not, by decoding it $c_1/c_1'$ with a first error detection code. The decoding results in initial data $b_1$, $b_1'$, where $b_1$ refers to decoded initial data which is not affected by errors and $b_1'$ refers to decoded initial data which is affected by errors. Initial data $b_1$ which is not affected by errors is then inputted on a first input of the second communication unit 708. If, on the other hand initial data $b_1'$ is affected by errors it $b_1'$ is instead stored in the memory 706, and the receiving system entity 700 requests the sending system entity to retransmit the initial data $b_1$ bitwise combined with encoded new data $c_2$ in an encoded combined data stream p.

The first communication unit 702 is adapted to receive the encoded combined data stream p and input it into the third forward error correction unit 710, which is adapted to determine if the encoded combined data stream p is affected by errors or not. The determination is performed by decoding the encoded combined data stream p employing a third forward error correction code, resulting in a combined data stream x. If the decoded data stream x is unaffected by errors, the third forward error correction unit 710 inputs it to the determination unit 712 on a first input of the first combination unit 714. The memory 706 is adapted to input the initial data $b_1'$ which is affected by errors on a second input of the first combination unit 714, which bitwise combines the decoded data stream x and the initial data stream $b_1'$ which is affected by errors, employing an XOR operation. The combination unit 714 produces then an estimate $c_2'$ of the encoded new data $c_2$ comprised in the combined data x, however with some bits being affected with errors. The bits of the estimate $c_2'$ which correspond to the bits which are affected by errors in the stored data stream $b_1'$ are affected by errors, i.e. the erroneous bits of the stored data $b_1'$ are transferred to the estimate $c_2'$.

The estimate $c_2'$ is inputted into the second forward error correction unit 716, which is adapted to correct the errors of the estimate $c_2'$ by decoding it applying the second forward error correction code, resulting in the new data $b_2$ which is unaffected by errors, which is outputted on a first output. The new data $b_2$ is further encoded by the second forward error correction unit 716 applying the second forward error correction code, resulting in that the encoded data stream $c_2$ is outputted on a second output of the second forward error correction unit 716. Finally, the encoded data stream $c_2$ is bitwise combined with the combined data stream x which is unaffected by errors in the second combination unit 718, by applying an XOR operation, resulting in the initial data $b_1$ which is unaffected by errors. Determining the retransmitted initial data $b_1$ by bitwise combining the encoded new data $c_2$ and the combined data x is possible, because the combined data x comprises the encoded new data $c_2$ bitwise combined with the initial data b1 at the sending system entity, and that the same XOR operation is employed when combining. The receiving system entity 700 controls the retransmission process and, e.g. by switching the input of the first communication unit 702 to the third forward error correction unit 710 when the initial data is determined to be affected by errors, and back to the first forward error correction unit 704 when no data has to be retransmitted. Similarly, the receiving system entity 700 switches the output of the second communication unit 708 to the output of the second combination unit 718 when retransmission is in progress, and back to the output of the first forward error correction unit 704, when retransmission is not in progress. The receiving system entity 700 is thus capable to receive initial data $b_1$ and decode it when it is unaffected by errors. The sending system entity 700 is further adapted to control retransmission of initial data $b_1$ which is affected by errors and receive it combined with new data.

It is to be noted that the forward error correction units 704, 716, 710 employs the corresponding forward error correction codes as the forward error correction units 404, 412, 410, of the sending system entity, described in an embodiment above with reference to FIG. 4. Moreover, the sending system entity and the receiving system entity employ the same non-linear operation for combining data. However, the system entities are not limited to use XOR operations, they may employ any suitable non-linear operation which enables the combination units 714, 718 to bitwise combine data streams and form resent initial data $b_1$ and new data $b_2$, within the inventive concept.

It is also to be denoted that the third forward error correction unit 710 typically employs a more robust error detection code than the first forward error correction unit 704. However, if the third forward error correction unit 710 indeed detects errors in the decoded combined data stream which it 710 is not capable to correct, the receiving system entity 700 may store the combined data stream which is affected by errors and request a further retransmission. In the further retransmission the combined data stream x will be combined with encoded new data in another combined data stream, as indicated in an above described embodiment.

Figure 8A:
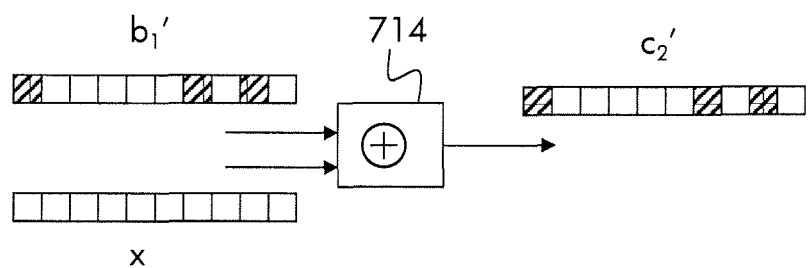
FIG. 8a-c are illustrations of processes in a receiving system entity according to further embodiments
Figure 8B:
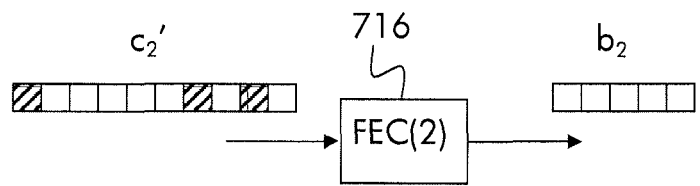
Figure 8C:
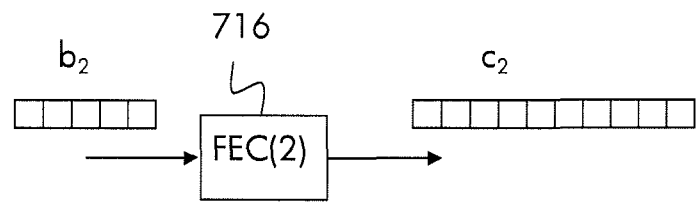

With reference to the FIGS. 8a-8c, showing exemplary illustrations, examples of the function of the combination unit 714 and the forward error correction unit 716 will now be described. The combination unit 714 and the forward error correction unit 716 are the same units as described with reference to FIG. 7.

The combination unit 714 illustrated in FIG. 8a, receives stored initial data $b_1'$ which is affected by errors on one input and the decoded combined data stream x which is unaffected by errors on another input. The combined data stream x is the result of a bitwise combining of initial data $b_1$ and encoded new data $c_2$, performed in a sending system entity. The erroneous bits in the data streams are indicated in the figure. The combination unit 714 combines the initial data $b_1'$ which is affected by errors with the combined data stream x which is not affected by errors, by bitwise applying an XOR operation, resulting in an estimate $c_2'$ of the encoded new data $c_2$ which is outputted. The estimate $c_2'$ comprises errors on the corresponding bits where the stored initial data $b_1'$ is affected by errors. By forming the estimate $c_2'$, determination of the new data $b_2$, the encoded new data $c_2$ and in turn, the retransmitted initial data $b_1$, is enabled, as described in an embodiment above. This will be further described below with reference to FIGS. 8b and 8c.

The forward error correction unit 716 illustrated in FIG. 8b receives the estimate $c_2'$ determined by the first combination unit 714, illustrated in FIGS. 7 and 8a. As described above are some bits of the estimate $c_2'$ affected by errors. The forward error correction unit 716 determines the new data $b_2$ sent encoded as $c_2$ from a sending system entity, by decoding the estimate $c_2'$ with a second forward error correction code. As described above, the second forward error correction code has been employed for encoding the new data $b_2$ at the sending system entity. The new data $b_2$ is unaffected by errors. The erroneous bits of the estimate $c_2'$ are indicated in the figure, similar to in the embodiment above.

Furthermore, the correction unit 716 illustrated in FIG. 8c encodes the determined new data $b_2$ resulting in encoded new data $c_2$, by employing the second forward error correction code.

By combining the initial data to be resent and new data in a combined data stream, which is able to split up when received, less data has to be transmitted. Moreover, the transmission of data can proceed during the transmissions, and thereby will the transmission be less delayed by retransmissions. Because less delay is introduced and less data has to be transmitted, the effective transmission rate will increase and the Quality of service (QoS) will be better experienced by the users.

It should be noted that FIGS. 3, 4, 6 and 7 merely illustrates various functional units in the sending system entity 300, 400 and the receiving system entity 600, 700, respectively, in a logical sense, although the skilled person is free to implement these functions in practice using any suitable software and hardware means. Thus, the invention is generally not limited to the shown structure of the sending system entities, and the receiving system entities, respectively, while their functional units may be configured to operate according to the methods and procedures described above for FIGS. 3, 4, 6 and 7, where appropriate. For instance, any functionality in a specific functional unit may be placed in another suitable functional unit, where appropriate.

The invention claimed is:

1. A method in a receiving system entity for controlling retransmission of data from a sending system entity, comprising the following steps being executed:
    determining that received initial data is affected by one or more errors, the received initial data initially sent correctly from the sending system entity, wherein the received initial data is coded with a first Forward Error Correction code;
    storing the received initial data which is affected by errors;
    requesting the sending system entity to resend the initial data;
    receiving combined data from the sending system entity, the combined data comprising the initial data which is unaffected by errors and new data, wherein the new data is coded with a second Forward Error Correction code and the combined data is coded with a third Forward Error Correction code;
    determining whether the combined data is unaffected or affected by errors;
    if the combined data is unaffected by errors,
        determining the initially sent data and the new data based on the stored initial data and the combined data; and
    if the combined data is affected by errors,
        storing the received combined data which is affected by errors;
        requesting the sending system entity to resend the combined data;

receiving second combined data from the sending system entity, the second combined data comprising the combined data which is unaffected by errors and second new data;

determining that the second combined data is unaffected by errors;

determining the combined data and the second new data based on the stored combined data and the second combined data; and determining the initially sent data and the new data based on the stored initial data and the determined combined data.

2. The method according to claim 1, wherein the step of determining that received initial data is affected by errors is performed by decoding the received data applying the first Forward Error Correction code.

3. The method according to claim 1, wherein the step of determining that the combined data is unaffected by errors is performed by decoding the combined data applying the third Forward Error Correction code.

4. The method according to claim 1, wherein the step of determining the initially sent data and the new data comprises:

determining an estimate of the new data being affected by errors, by bitwise combining the received combined data and the stored initial data which is affected by errors;

determining the new data which is unaffected by errors, by decoding the estimate with the second Forward Error Correction Code;

encoding the determined new data by applying the second Forward Error Correction code; and determining the initially sent data by bitwise combining the encoded determined new data and the received combined data.

5. The method according to claim 4 wherein one or more of the procedures of bitwise combining are performed by applying XOR operations.

6. A sending system entity adapted to control retransmission of data to a receiving system entity, the sending system entity comprising:

a communication unit adapted to send initial data to the receiving system entity and further adapted to send combined data to the receiving system entity, the communication unit is further adapted to send second combined data to the receiving system entity;

a combination unit adapted to bitwise combine the initial data to be retransmitted with new data to create a combined data stream before being retransmitted, the combination unit is further adapted to bitwise combine the combined data to be retransmitted with second new data to create second combined data stream before being retransmitted;

a forward error correction unit adapted to encode the initial data to be sent by applying a first forward error correction code, and encode the new data by applying a second forward error correction code before being combined, and further adapted to encode the combined data stream by applying a third forward error correction code before being transmitted; and a control unit adapted to receive requests for retransmission of the initial data from the receiving system entity, and further adapted to control when the initial data will be sent and when the combined data will be sent, the control unit is further adapted to receive requests for retransmission of the combined data from the receiving system entity, and further adapted to control when the second combined data will be sent.

7. The sending system entity according to claim 6, wherein the forward error correction unit is further adapted to encode the initial data to be resent by applying the first forward error correction code.

8. A receiving system entity adapted to control retransmission of data from a sending system entity, comprising:

a communication unit adapted to receive initial data from the sending system entity, wherein the received initial data is coded with a first Forward Error Correction code and further adapted to receive combined data from the sending system entity, the combined data comprising resent data and new data, wherein the new data is coded with a second Forward Error Correction code and the combined data is coded with a third Forward Error Correction code, the communication unit is further adapted to receive second combined data from the sending system entity, the second combined data comprising resent combined data and second new data;

a forward error correction unit adapted to determine whether the initial data is affected by errors or not, to store the initial data which is affected by errors, and further adapted to determine whether the combined data is affected by errors or not, the forward error correction unit is further adapted to store the combined data which is affected by errors, and further adapted to determine whether the second combined data is affected by errors or not;

a combination unit adapted to determine the resent data and the new data based on the stored initial data which is affected by errors and the combined data which is not affected by errors, the combination unit is further adapted to determine the combined data and the second new data based on the stored combined data which is affected by errors and the second combined data which is not affected by errors, and is further adapted to determine the initially sent data and the new data based on the stored initial data which is affected by errors and the determined combined data which is not affected by errors; and a control unit adapted to monitor when the receiving system entity receives the initial data and when the receiving system entity receives the combined data, and further adapted to request the sending system entity to retransmit data which is affected by errors, the control unit is further adapted to monitor when the receiving system entity receives the second combined data, and further adapted to request the sending system entity to retransmit the combined data which is affected by errors.

9. The receiving system entity according to claim 8, wherein the forward error correction unit is adapted to decode the initial data employing the first forward error correction code when determining whether the initial data is affected by errors or not, and further adapted to decode the combined data with the third forward error correction code when determining whether the combined data is affected by errors or not.

10. The receiving system entity according to claim 8, wherein the combination unit is further adapted to:

determine an estimate of the new data being affected by errors, by bitwise combining the received combined data and the stored initial data which is affected by errors;

determine the new data being unaffected by errors, by decoding the estimate with the second Forward Error Correction Code;

encode the determined new data, applying the second Forward Error Correction code; and determine the initially sent data by bitwise combining the encoded determined new data and the received combined data.

11. The receiving system entity according to claim 10 wherein the combination unit is adapted to employ an XOR operation to perform one or more of the bitwise combining.

12. The method according to claim 1 wherein determining the initially sent data and the new data comprises extracting the initially sent data and the new data from the combined data.

* * * * *